(No Model.)

S. F. WHALEN.
HOSE COUPLING.

No. 528,051.　　　　　　　　Patented Oct. 23, 1894.

Witnesses
Byron F. Wood
Bird A. Bliven

Stephen F. Whalen Inventor per
John S. Miller Attorney

UNITED STATES PATENT OFFICE.

STEPHEN F. WHALEN, OF HELENA, MONTANA.

HOSE-COUPLING.

SPECIFICATION forming part of Letters Patent No. 528,051, dated October 23, 1894.

Application filed February 15, 1894. Serial No. 500,318. (No model.)

*To all whom it may concern:*

Be it known that I, STEPHEN F. WHALEN, a citizen of the United States, residing at Helena, in the county of Lewis and Clarke, State of Montana, have invented certain new and useful Improvements in Hose-Couplings, of which the following is a specification.

The invention relates to that class of couplings in which a hose end is slipped over the end of an open tube and then clamped against its surface, and it is fully illustrated in the accompany drawings, in which—

Figure 1:
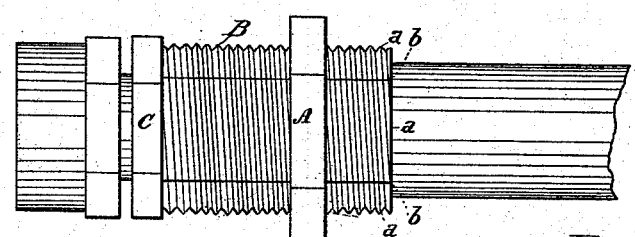
Figure 2:
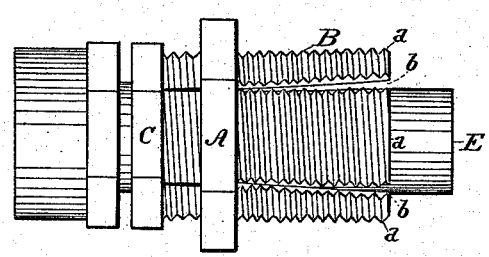
Figure 3:
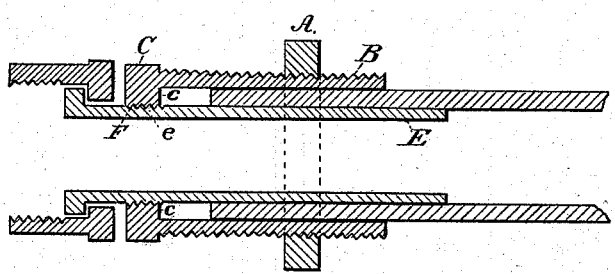
Figure 4:
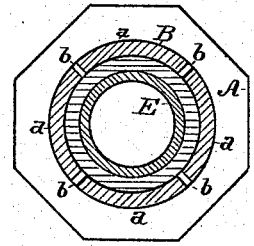

Figure 1 is a side view of the coupling as it appears when in use. Fig. 2 is a like view with certain hose clamping parts loosened and with the clamped hose end omitted. Figs. 3 and 4 are, respectively, an axial section and a cross section of the devices when disposed as in Fig. 1.

In the figures, E is a short open tube having at one end the usual external flange for engaging in the ordinary way parts without novelty. This tube has an external diameter approximately equal to the internal diameter of the hose to be coupled and is intended to slip within and project from the end of such hose. Over this tube is passed an outer tube whose inner diameter is materially greater than the outer diameter of the inner tube, and this outer tube is preferably provided with a non-circular external flange C by which it may be rotated or held against rotation, and is further provided with an internal annular threaded flange c which engages threads e upon the inner tube and thus holds the two tubes in fixed relative positions, with their axes coincident. The free end of the outer tube B is divided into segments a by longitudinal slots b, preferably extending from said free end to the flange C. An internally threaded ring A encircles the outer tube and moves back and forth thereon, and the parts are so arranged that when the ring is near the flange C the segments a are at such distance from the inner tube that a hose end slipped over the latter easily passes between it and the segments, which are sprung outward; but if the ring be then moved toward the free end of the tube B, it forces all the segments inward and thus firmly clamps the hose against the inner tube. As shown, the ring is externally non-circular in order that it may be grasped more securely.

What I claim is—

1. The combination with an inner tube adapted to slip within a hose end and project therefrom, of an outer tube adapted to pass over said hose end, having one end portion divided into sections by longitudinal slots, and having its other end portion rigidly secured to the inner tube, and a ring arranged to pass back and forth over the outer tube to press said sections inward.

2. The combination with an inner tube adapted to slip within and project from a hose end, and provided with external threads upon the projecting portion, of an outer externally threaded tube longitudinally slotted from one end and provided with an internal, threaded flange to engage the threaded portion of the inner tube, and a threaded ring encircling and engaging the outer tube, substantially as set forth.

STEPHEN F. WHALEN. [L. S.]

Witnesses:
BYRON F. WOOD,
BIRD A. BLIVEN.